United States Patent [19]

Kessler et al.

[11] Patent Number: 4,955,801
[45] Date of Patent: Sep. 11, 1990

[54] AUTOMATIC APPARATUS FOR MAKING STRUDEL TYPE PASTRY

[76] Inventors: Herb Kessler, 173 W. 78 St., New York City, N.Y. 10024; George Spector, 233 Broadway, Rm. 3815, New York, N.Y. 10007

[21] Appl. No.: 300,313

[22] Filed: Jan. 23, 1989

[51] Int. Cl.⁵ .................... B29C 39/06; A21C 3/10; A21C 11/10

[52] U.S. Cl. .................................. 425/92; 99/450.1; 99/450.3; 99/450.6; 425/96; 425/101; 425/106; 425/115; 425/142; 425/145; 425/308; 425/310

[58] Field of Search ............... 425/91, 92, 103, 142, 425/308, 310, 363, 364, 115, 145, 96, 101, 202, 162, 164, 106; 118/679, 676; 426/289, 496, 517, 519, 523, 549; 99/450.1, 450.3, 450.6

[56] References Cited

U.S. PATENT DOCUMENTS

| | | | |
|---|---|---|---|
| 2,579,514 | 12/1951 | Rhodes | 118/679 |
| 2,764,779 | 10/1956 | Zona | 425/364 |
| 3,192,796 | 7/1965 | Peeps et al. | 118/679 |
| 4,056,346 | 11/1977 | Hayashi | 425/92 |
| 4,647,468 | 3/1987 | Pinto | 425/308 |
| 4,741,916 | 5/1988 | Heidel et al. | 425/308 |
| 4,743,187 | 5/1988 | Schermutzki | 425/91 |

FOREIGN PATENT DOCUMENTS

| | | | |
|---|---|---|---|
| 0528872 | 7/1931 | Fed. Rep. of Germany | 425/310 |
| 2451326 | 5/1976 | Fed. Rep. of Germany | 425/363 |
| 2703331 | 7/1977 | Fed. Rep. of Germany | 425/363 |
| 0775320 | 8/1980 | U.S.S.R. | 118/676 |
| 1259989 | 9/1986 | U.S.S.R. | 425/142 |

Primary Examiner—Willard Hoag

[57] ABSTRACT

A sensor controlled apparatus for making a thin strudel type pastry which mixes, spreads and conveys a thin strudel layer on a film through various process stages such as depositing oil, sugar, cinnamon and nuts filling so that the resultant product can be cut rolled and baked.

5 Claims, 1 Drawing Sheet

AUTOMATIC APPARATUS FOR MAKING STRUDEL TYPE PASTRY

BACKGROUND OF THE INVENTION

The instant invention relates generally to baking goods and more specifically it relates to a product, process and apparatus for making filled pastry.

Numerous baking goods have been provided in prior art that are adapted to contain various ingredients and be prepared in different ways. While these units may be suitable for the particular purpose to which they address, they would not be as suitable for the purposes of the present invention as heretofore described.

SUMMARY OF THE INVENTION

A primary object of the present invention is to provide a product, process and apparatus for making filled pastry that will overcome the shortcomings of the prior art devices.

Another object is to provide a product, process and apparatus for making filled pastry in which specific components are mixed together for making the dough and filling for a strudel product.

An additional object is to provide a product, process and apparatus for making filled pastry in which a mechanism is constructed and utilized for preparing the strudel product prior to rolling, cutting and baking.

A further object is to provide a product, process and apparatus for making pastry that is simple and easy to use.

A still further object is to provide a product, process and apparatus for making pastry that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
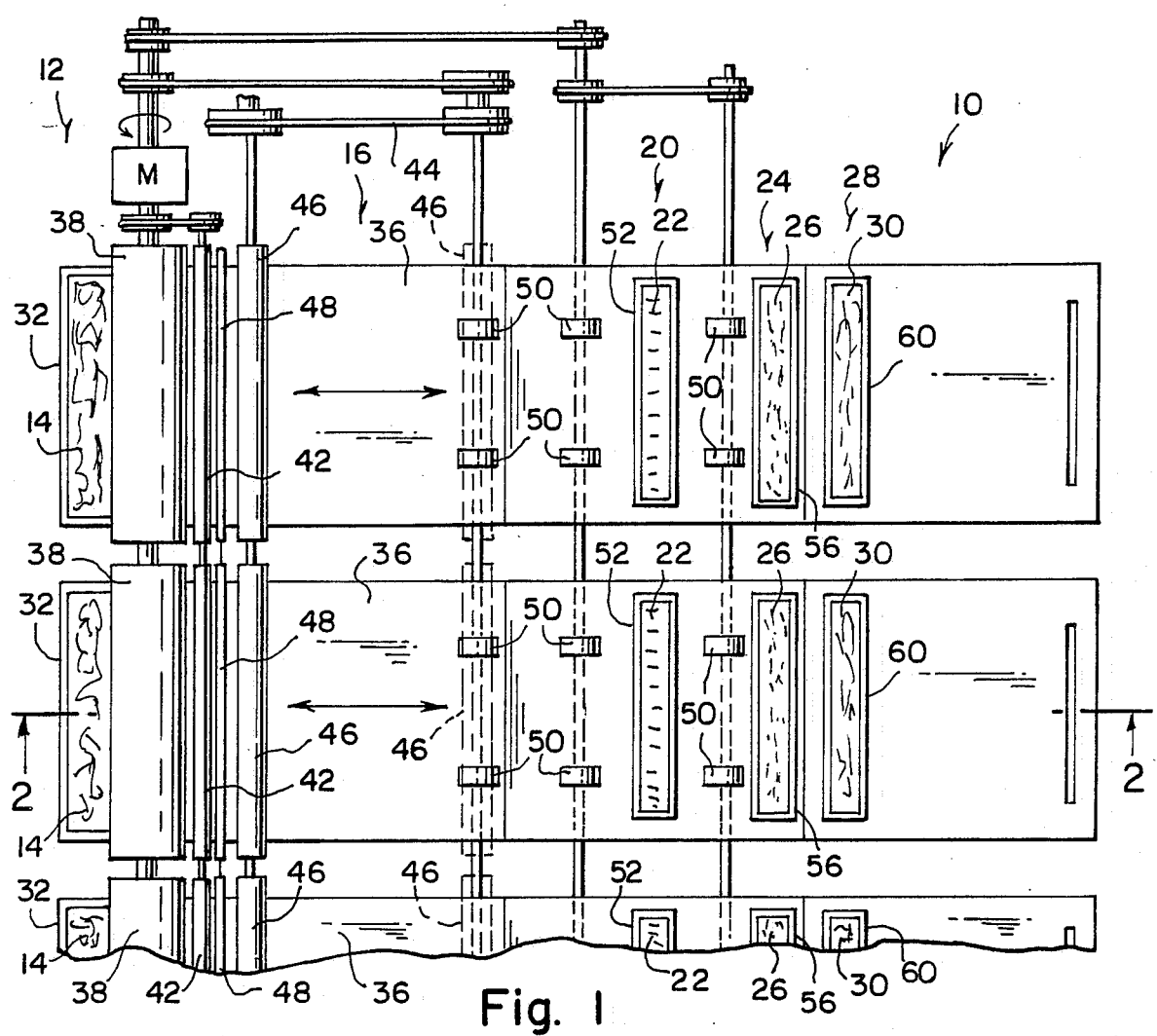
FIG. 1 is a top view of the invention.
Figure 2:
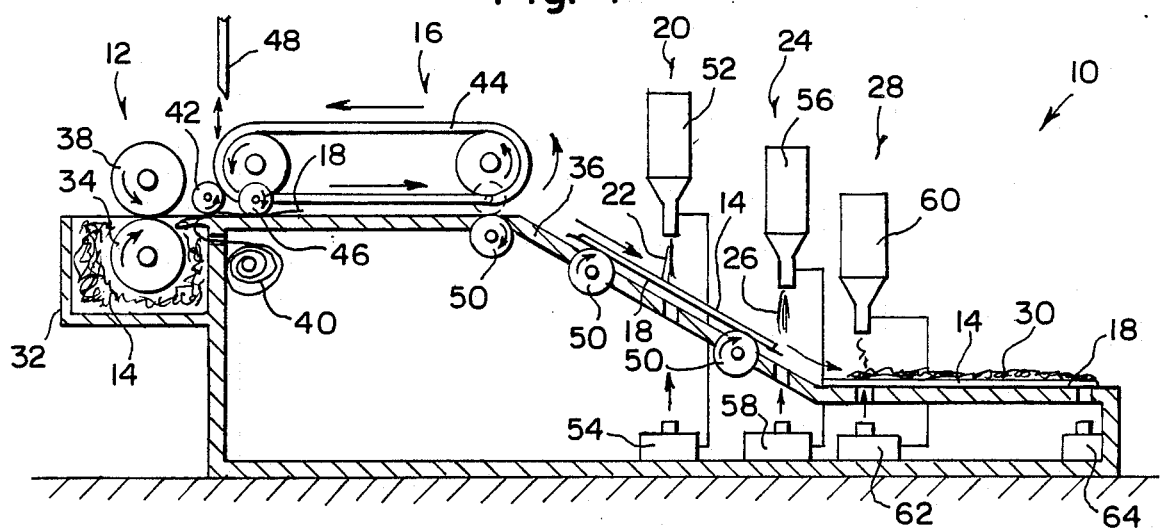
FIG. 2 is a cross sectional view taken along line 2—2 in FIG. 1 showing the rolling, cutting and filling stages of the apparatus for preparing the dough and depositing the filling on the dough so that it can be rolled into strudel.

Turning now descriptively to the drawings, in which similar reference characters denote similar elements throughout the several views, FIGS. 1 and 2 illustrate an apparatus 10 for forming strudel portions prior to rolling, cutting and baking. The apparatus 10 contains a first stage 12 for mixing ingredients together for making the dough 14. A second stage 16 is for spreading the dough 14 very thin upon a flexible platen 18. A third stage 20 is for covering the dough 14 with a light film of oil 22. A fourth stage 24 is for sprinkling the dough 14 with a mix 26 of sugar, cinnamon and chopped nuts. And finally a fifth stage 28 is for putting filling 30 on the dough 14 so that the strudel can be rolled, cut and baked at 350° for thirty to thirty five minutes.

The first stage 12 includes a tray 32 for holding the dough ingredients therein and a first motorized roller 34 within the tray 32 for mixing the dough ingredients together.

The second stage 16 includes a platform 36 extending from the tray 32. A second motorized roller 38 is in engagement above the first motorized roller 34 for carrying the dough 14 out of the tray 32 onto the platform 36. A roll 40 of flexible platen 18 is carried below the platform 36 and extends upwardly onto the platform. A third motorized roller 42 on the platform 36 is for engaging with the dough 14 on the flexible platen 38. An endless motorized belt 44 is carried above the platform 36. A moveable roller 46 is carried o the endless belt 44 for spreading the dough 14 thin on the flexible platen 18. A cutter blade 48 is vertically moveable above the platform 36 near the tray 32 for cutting off a section of the thin dough 14 and a portion of the flexible platen 18.

The third stage 20 includes a plurality of recessed motorized rollers 50 within the platform 36 for carrying each section of the thin dough 14 on portion of the flexible platen 18. A first hopper 52 is disposed above the platform 36 for dispensing the oil 22 therefrom onto each section of thin dough 14. A first sensor 54 is disposed below the platform 36 for operating the first hopper 52 when each section of thin dough 14 on portion of the flexible platen 18 passes thereby.

The fourth stage 24 includes a second hopper 56 disposed above the platform 36 for dispensing the mixed sugar, cinnamon and chopped nuts 26 therefrom onto each section of thin dough 14. A second sensor 58 is disposed below the platform 36 for operating the second hopper 56 when each section of thin dough 14 on portion of the flexible platen 18 passes thereby.

The fifth stage 28 includes a third hopper 60 disposed above the platform 36 for dispensing the filling 30 therefrom onto each section of thin dough 14. A third sensor 62 is disposed below the platform 36 for operating the third hopper 60 when each section of thin dough 14 on portion of the flexible platen 18 passes thereby. A stop sensor 64 with time delay is disposed below end of the platform 36 for shutting down the apparatus 10 when forward edge of forward section of thin dough 14 on portion of the flexible platen 18 comes thereto, so that the strudel can be rolled, cut and baked.

The dough 14 for making the strudel consists of six cups of double sifted flour, seven ounces of sugar, one teaspoon of salt, half cup of oil, one tablespoon of vinegar, one and a half cups of water and two eggs.

The filling 30 consists of peach preserves, strawberry preserves, drained maraschino cherries cut into quarters, drained crushed pineapple, ground white raisin, lemon peel, orange peel, corn flake crumbs and nut crumbs.

The strudel is prepared by the following steps:
1. Mix the flour, sugar and salt together.
2. Make a well in center.
3. Place the vinegar, water and eggs in the well.
4. Spread the dough 14 very thin.
5. Cover the dough 14 with a light film of oil.
6. Sprinkle the dough 14 with a mixture of sugar and cinnamon.
7. Sprinkle the dough 14 with chopped nuts.
8. Place the filling 30 on the dough 14.
9. Roll the dough 14 and filling 30 into rolls.

10. Cut the rolls almost to the bottom, but not quite all the way through.

11. Bake the strudel at 350° for thirty to thirty five minutes.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for forming thin pastry with a filling such as strudel prior to rolling, cutting and baking which comprises:
   (a) a conveying platform;
   (b) means for mixing ingredients together for making the dough and conveying said dough forward on to said platform;
   (c) means for providing a carrying film for said dough;
   (d) means for spreading a thin layer of dough upon said film;
   (e) means for moving said spreading means forward;
   (f) means for covering the dough with a film of oil, forward of said spreading means;
   (g) means for moving said dough forward from said means for covering said dough with a film of oil;
   (h) means for depositing the dough with other ingredients;
   (i) means for depositing filling on said dough;
   (j) means for moving said dough forward to receive said filling;
   (k) means for synchronizing all said means for proper timing.

2. An apparatus as recited in claim 1, wherein said mixing means comprises:
   (a) a tray for holding the dough ingredients therein;
   (b) a first motorized roller within said tray for mixing the dough ingredients together; and wherein said spreading means comprises:
   (c) a second motorized roller, in engagement above said first motorized roller for carrying the dough out of said tray onto said platform; and wherein said means for providing said carrying film comprises:
   (d) a third motorized roller on said platform for engaging with the dough on said flexible film and wherein said means for moving said spreading means comprises:
   (e) an endless motorized belt carried above said platform with a shaft connected to said belt attached to a roller, said apparatus further including:
   (f) a cutter blade vertically moveable above said platform near said tray for cutting off a section of the thin dough and a portion of said flexible film.

3. An apparatus as recited in claim 2, wherein said oil covering means comprises:
   (a) a plurality of recessed motorized rollers within said platform for carrying each section of the thin dough on portion of said flexible film;
   (b) a first hopper disposed above said platform for dispensing the oil onto each section of thin dough; and
   (c) a first sensor disposed below said platform for operating said first hopper when each section of thin dough on portion of said flexible film passes thereby.

4. An apparatus as recited in claim 3, wherein said means for depositing other ingredients comprises:
   (a) a second hopper disposed above said platform for dispensing said ingredients therefrom onto each section of thin dough; and
   (b) a second sensor disposed below said platform for operating said second hopper when each section of thin dough on portion of said flexible film passes thereby.

5. An apparatus as recited in claim 4, wherein said means for depositing filling comprises:
   (a) a third hopper disposed above said platform for dispensing the filling therefrom onto each section of thin dough;
   (b) a third sensor disposed below said platform for operating said third hopper when each section of thin dough on portion of said flexible film passes thereby; and
   (c) a stop sensor with time delay disposed below end of said platform for shutting down said apparatus when forward edge of forward section of thin dough on portion of said flexible film comes thereto so that the strudel can be rolled, cut and baked.

* * * * *